United States Patent [19]
Devillers

[11] 3,928,945
[45] Dec. 30, 1975

[54] APPARATUS FOR MACHINING THE ANGLES OF A PLATE

[75] Inventor: Julien Albert Devillers, Livry Gargan, France

[73] Assignee: Intercontinental Trading Company - Intraco, Puteaux, France

[22] Filed: Dec. 24, 1974

[21] Appl. No.: 536,191

[30] Foreign Application Priority Data
Dec. 26, 1973 France .............................. 73.46203
June 6, 1974 France .............................. 74.19629

[52] U.S. Cl. ...................... 51/80 A; 51/76 R; 51/99
[51] Int. Cl.² ............................................ B24B 9/00
[58] Field of Search ............. 51/74, 76 R, 80 A, 99, 51/33 R, 39, 47, 137–139, 147, 38, 77, 78, 87

[56] References Cited
UNITED STATES PATENTS

| | | | |
|---|---|---|---|
| 1,997,386 | 4/1935 | Louviaux | 51/33 R |
| 2,021,198 | 11/1935 | Owen | 51/76 R X |
| 3,041,788 | 7/1962 | Carlow | 51/87 R |

FOREIGN PATENTS OR APPLICATIONS

| | | | |
|---|---|---|---|
| 543,467 | 7/1941 | United Kingdom | 51/80 A |

Primary Examiner—Al Lawrence Smith
Assistant Examiner—Nicholas P. Godici
Attorney, Agent, or Firm—Gerald S. Geren

[57] ABSTRACT

An apparatus is provided for machining at least one angle of a moving plate with a rotary grinding wheel.

This apparatus comprises a rotary grinding wheel, a ring of rollers surrounding the grinding wheel and mounted for free rotation thereon and means for moving the grinding wheel/ring assembly between a first position and a second position.

In the first position one of the rollers is situated in the path followed by the plate. In the second position two successive rollers are simultaneously in contact with one lateral edge of the plate. Between the first and second position is a third, intermediate position in which the grinding wheel is in contact with the plate to be machined and two successive rollers are in contact with the front or rear edge and the lateral edge, respectively, of the plate, the grinding wheel then being in contact with the above mentioned angle.

The apparatus is particularly applicable to the grinding of the angles of plates of glass.

11 Claims, 5 Drawing Figures

1

APPARATUS FOR MACHINING THE ANGLES OF A PLATE

FIELD OF THE INVENTION

This invention relates to an apparatus for machining the angles of a plate, and is particularly concerned with machining the angles of a plate of glass using a rotary grinding wheel.

BACKGROUND OF THE INVENTION

Rectangular plates of glass, whether transparent, as in the case of plate glass, or silvered, as in the case of mirrors, are obtained by cutting with a diamond or cutting wheel and, as a result, have sharp edges which have to be bevelled both for aesthetic and for safety reasons.

At present, eight of the twelve edges of these plates are bevelled in continuously operating machines, whereas the four short edges corresponding to the thickness of the plate are generally bevelled by hand or, by a semiautomatic process. In both cases, this operation necessitates temporary stoppage of the plate and involves additional labour.

SUMMARY OF THE INVENTION

The present invention provides an apparatus for machining an angle of a moving plate comprising a rotary grinding wheel; a ring of rollers surrounding the grinding wheel and mounted for free rotation thereon; means for displacing the grinding wheel and the ring together between a first position in which one of the rollers is situated in the path followed by the plate, and a second position in which two successive rollers are simultaneously in contact with one lateral edge of the plate, via a third intermediate position in which the grinding wheel is in contact with the angle of the plate to be machined and in which two successive rollers are in contact with the front or rear edge and with said side edge, respectively, of the plate; and means for biassing the grinding wheel and ring into the said first position.

The invention makes it possible to bevel the angles of a plate of glass while it is travelling without any need for its travel to be interrupted. In addition, it is possible by virtue of the invention to obtain bevelled angles whose quality and dimensions are much more regular than those obtained by prior known processes.

A machining installation may be formed which comprises two sets of apparatus according to the invention, one on either side of the path followed by the plate to be machined.

To enable the arrangement to function in the correct manner, it has been found that the number of rollers on the rotary member should be at least three and that it is of particular advantage for the rotary member to carry four rollers.

DETAILED DESCRIPTION OF PREFERRED EMBODIMENTS

Figure 2:
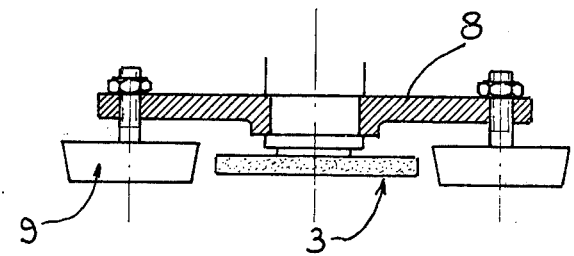
FIG. 2 is a section through the axis of the grinding wheel showing the position of the rollers on the rotary member.
Figure 1:
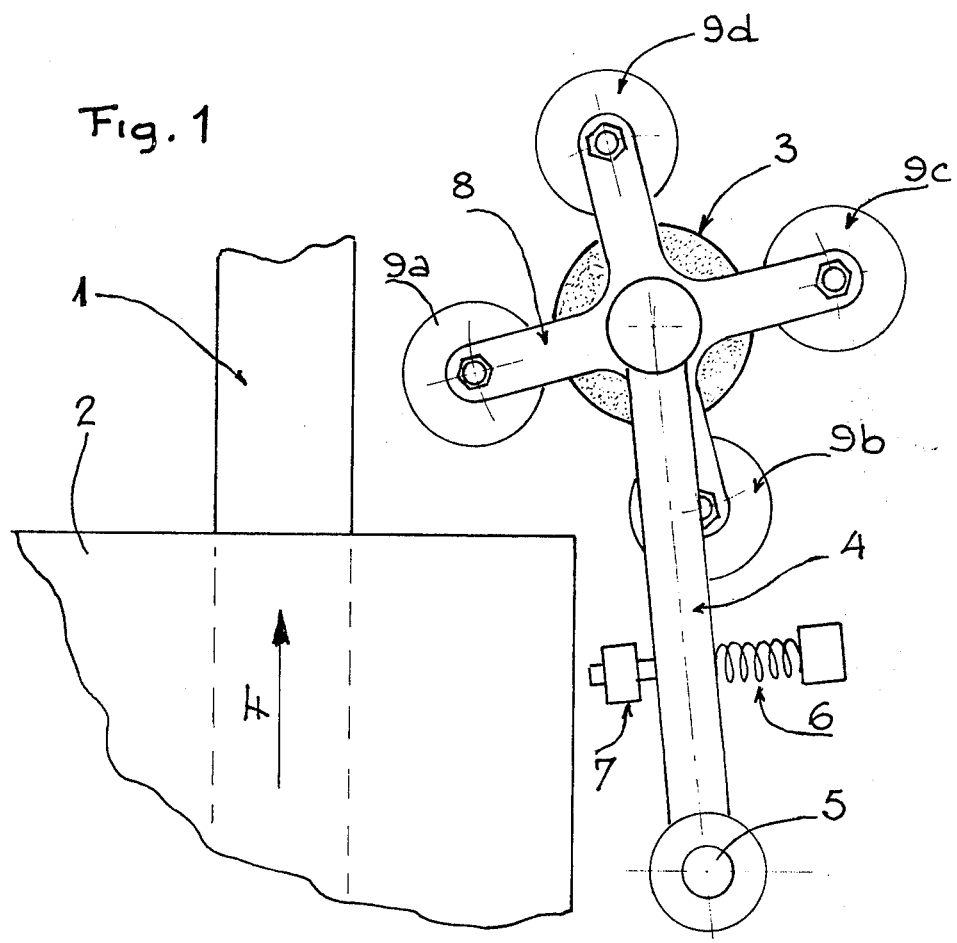
FIG. 1 is a plan view of the apparatus according to the invention before the machining of a front angle of a rectangular plate, i.e. in a position in which one of the rollers is situated in the path followed by the plate.

The apparatus illustrated in FIG. 1 is associated with a conveyor 1 carrying a plate of glass 2 in the direction of the arrow F. This apparatus comprises an arm 4 one end of which is connected to a pivot 5 perpendicular to the plane of the plate 2 and the other end of which carries a rotary grinding wheel 3 and a rotary member 8 rotatably mounted thereon and carrying rollers 9. The axis of rotation of the grinding wheel 3 and the axis of rotation of the rotary member 8 are coincident and are parallel to the axis of the pivot 5. The member 8 carries four rollers 9a, 9b, 9c and 9d rotatably mounted at 90° intervals from one another on the member 8. As shown in FIG. 2 these rollers are frustoconical in shape to enable the degree of bevelling to be adjusted and/or the wear of the grinding wheel to be compensated.

The arm 4 is resiliently biassed towards the plate 2 by a spring 6 or any equivalent resilient means. An adjustable stop 7 limits the movement of the arm so that when the arm is in contact with the stop one of the rollers (the roller 9a in FIG. 1) is situated in the path of the plate 2.

Figure 3:
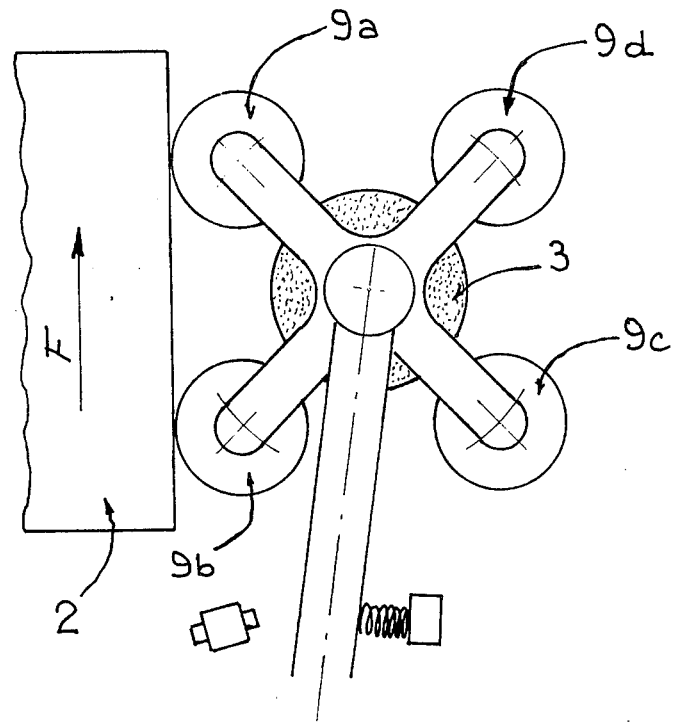
FIG. 3 is a plan view of the apparatus after machining of the front angle.
Figure 4:
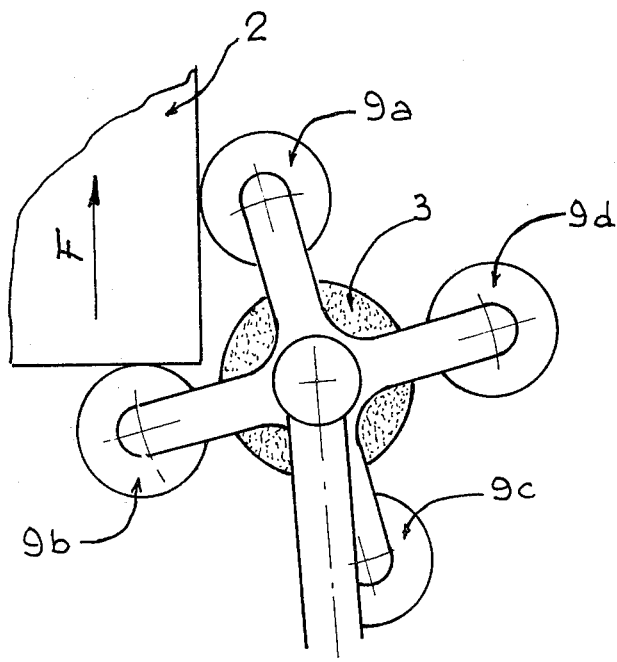
FIG. 4 is a plan view of the apparatus just before machining of the rear angle corresponding to the front angle which has just been machined.

The front edge of the plate 2 to be bevelled, which is carried by the conveyor 1 in the direction of the arrow F, comes into contact with one of the rollers (namely the roller 9a in FIG. 1), thus causing the rotary member 8 to rotate about its axis. However, the member 8 can only turn until the roller 9b comes into contact with the side edge of the plate 2. When the point of contact between the roller 9a and the front edge of the plate and the point of contact between the roller 9b and the side edge of the plate are at equal distances from the apex of the angle to be bevelled, this angle is in contact with the grinding wheel 3 and the bevelling operation takes place. The plate continues its travel and pushes the roller 9a towards the outside, with the result that the grinding wheel is moved away from the angle of the plate, the rotary member 8 is pushed back, the arm 4 is turned about the pivot 5 and the spring 6 compressed. The rollers 9a and 9b thus assume a position in which they rest on the side edge of the plate, thereby preventing any contact between the plate and the grinding wheel (FIG. 3). When the rear edge of the plate passes the roller 9b, the rotary member 8 rotates again under the effect of the spring 6 and the grinding wheel thus bevels the rear angle of the plate (FIG. 4). Once the rear angle has been bevelled, the apparatus returns to the position which it occupied before the passage of the plate (FIG. 1) and is ready for machining the front angle of another plate.

By using the arrangement described above, it is possible to machine one of the front edges of a plate and then the corresponding rear edge of the same plate, with the result that, in cases where it is desired to machine all four angles of the plate, the two remaining edges have to be machined in another operation. It has been found that it is of particular advantage to machine the four edges of a given plate in a single operation by providing two apparatuses of the kind described above arranged on either side of a conveyor for the plate of glass.

Figure 5:
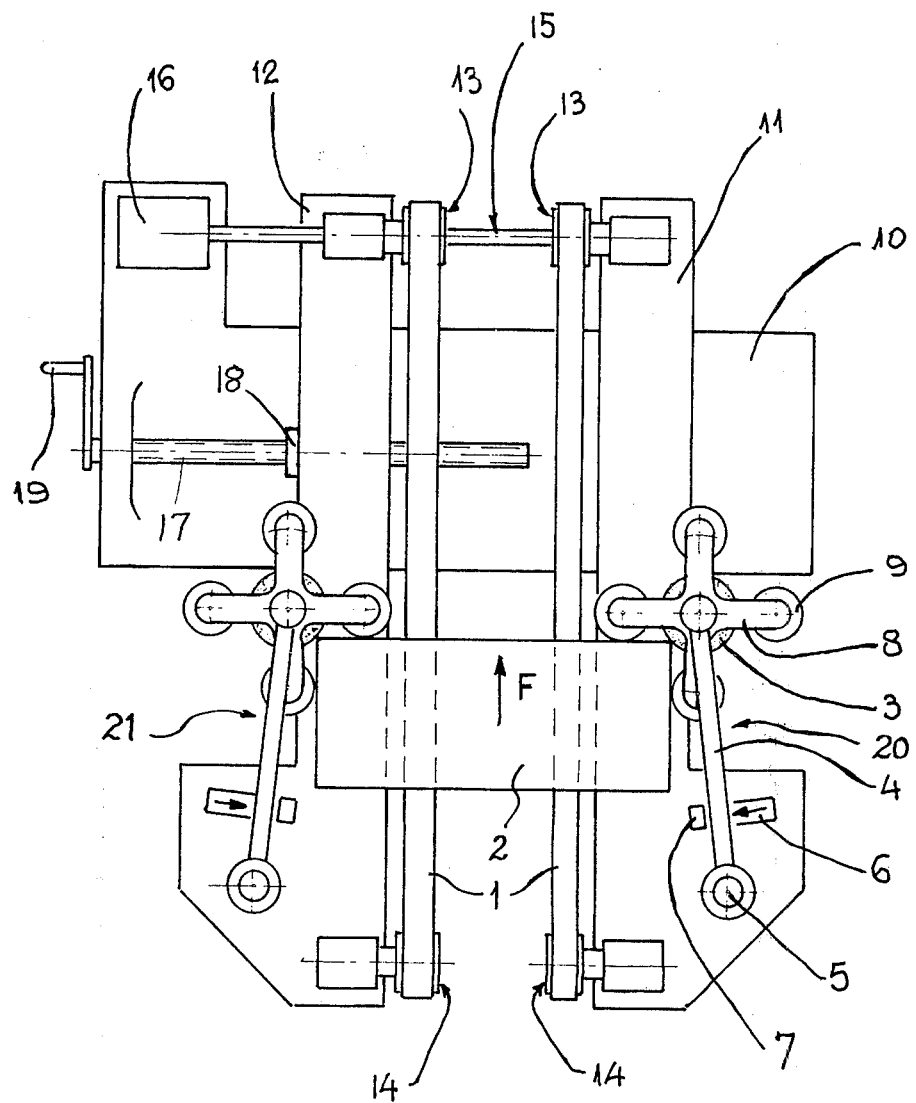
FIG. 5 is a plan view of an installation comprising two machining apparatuses arranged on either side of the plate whose angles are to be machined.

FIG. 5 shows a machining installation of this kind comprising two machining apparatuses 20 and 21 of the type described above arranged symmetrically on either side of a conveyor for the plates of glass. The interval between apparatus 20 and apparatus 21 may be adjusted according to the width of the plate 2 to be machined.

A fixed bench 11 and a mobile bench 12 are mounted on a common base 10, receiving the apparatus 20 and the apparatus 21, respectively. The apparatus 20 is identical with the apparatus described above with reference to FIGS. 1 to 4 and comprises an arm 4 one end of which is connected to a pivot 5 integral with the bench 11 and the other end of which carries a rotary grinding wheel 3 and its motor (not shown), a rotary member 8 fitted with rollers 9, an adjustable stop 7 and a resilient biassing means 6.

The apparatus 21 is a mirror image of the apparatus 20.

In addition, each of the benches supports a conveyor belt 1 driven by a drive pulley 13 and changing direction at a non-driven pulley 14. A single shaft 15 driven by a gear motor 16 extends through the drive pulleys 13, the drive pulleys being keyed to the drive shaft for rotation therewith being capable of sliding with respect to the drive shaft. Each bench is completed by a contact-pressure system (not shown) by which the plate of glass is held on the conveyor belt.

An adjusting screw 17 supported by the base 10 and extending through a nut 18 integral with the mobile bench 12 enables the interval between the benches to be varied according to the width of the plates to be bevelled by turning a handle 19 integral with the screw 17.

The apparatuses 20 and 21 may thus be directly fitted to continuously operating machines of the type used for machining the peripheral edges of rectangular or square plates. Machines of this kind are known in the mirror trade as bilateral machines. Accordingly, it is sufficient to assemble the apparatus 20 and 21 on each of the existing benches, and this affords several advantages of economy from the fact that the base 10, the benches 11 and 12, the gear motor and the adjusting system, are all components of existing bilateral machines.

The apparatus according to the invention may be used in cases where it is desired to bevel a sharp edge at the angles of a parallelepiped of hard material, such as glass. It may be used in mirror manufacture for finishing panes of glass or mirrors, particularly in cases where it is not intended to provide a frame. It is of particular advantage in cases where the plates of glass thus finished are intended to be subjected to a heat treatment, namely hardening, because the grinding marks left after machining using the apparatus of the invention are parallel to the faces of the plate and hence do not form potential starting points for cracks.

It will be appreciated that the apparatus according to the invention is by no means confined to the embodiment described above and illustrated in the accompanying drawings, and that it also lends itself to other embodiments.

For example, it is possible to obtain different bevelling patterns or even to bevel only certain angles by arranging the grinding wheel eccentrically relative to the rotary member or even by distributing the rollers at irregular intervals around the rotary member.

In addition, it will be appreciated that the means used for displacing the grinding wheel and the ring are not confined to a pivotal arm, and that they may be formed for example by a sliding arm or by other equivalent mechanical means.

In cases where it is desired to bevel the two edges of the chamfered section, it is possible to use an apparatus equipped with a grooved grinding wheel instead of a cyndrical grinding wheel providing chamfering of the angle has previously been carried out by means of an apparatus according to the invention equipped with a cyndrical grinding wheel.

We claim:

1. An apparatus for machining an angle of a moving plate comprising a rotary grinding wheel; a ring of rollers surrounding the grinding wheel and mounted for free rotation thereon; means for displacing the grinding wheel and the ring together between a first position in which one of the rollers is situated in the path followed by the plate, and a second position in which two successive rollers are simultaneously in contact with one lateral edge of the plate, via a third intermediate position in which the grinding wheel is in contact with the angle of the plate to be machined and in which two successive rollers are in contact with the front or rear edge and with said side edge, respectively of the plate; and means for biassing the grinding wheel and ring into the said first position.

2. An apparatus as claimed in claim 1, wherein the ring comprises at least three rollers.

3. An apparatus as claimed in claim 2, wherein the ring comprises four rollers.

4. An apparatus as claimed in claim 2 wherein the rollers are distributed at regular intervals around the ring.

5. An apparatus as claimed in claim 1 wherein the rollers are frustoconical.

6. An apparatus as claimed in claim 2 wherein the grinding wheel is arranged at the centre of the ring.

7. An apparatus as claimed in claim 1 wherein the displacement means are in the form of an arm having one end fixed to a pivot perpendicular to the plane of the plate and its other end supporting the grinding wheel and the ring of rollers, the axis of rotation of the grinding wheel and of the ring being parallel to the axis about which the arm pivots.

8. An apparatus as claimed in claim 7, comprising a spring adapted to bias the arm resiliently to said first position and a limit stop positioned to maintain the arm in the said first position.

9. An installation for machining the angles of a rectangular, moving plate, which comprises two machining apparatuses arranged on either side of a conveyor for the plate; each of said machining apparatus comprising a rotary grinding wheel; a ring or rollers surrounding the grinding wheel and mounted for free rotation thereon; means for displacing the grinding wheel and the ring together between a first position in which one of the rollers is situated in the path followed by the plate, and a second position in which two successive rollers are simultaneously in contact with one lateral edge of the plate, via a third intermediate position in which the grinding wheel is in contact with the angle of the plate to be machined and in which two successive rollers are in contact with the front of rear edge and with said side edge, respectively of the plate; and means for biassing the grinding wheel and ring into the said first position.

10. An installation as claimed in claim 9, comprising means for adjusting the interval between the two apparatuses according to the width of the plate to be machined.

11. An installation as claimed in claim 10, wherein the two apparatuses are mounted on a fixed bench and a mobile bench, respectively of a conveyor, each of the benches supporting a conveyor belt.

* * * * *